United States Patent [19]

Gerstenfeld

[11] Patent Number: 4,827,418
[45] Date of Patent: May 2, 1989

[54] EXPERT SYSTEM FOR AIR TRAFFIC CONTROL AND CONTROLLER TRAINING

[75] Inventor: Arthur Gerstenfeld, Newton, Mass.

[73] Assignee: UFA Incorporation, Newton, Mass.

[21] Appl. No.: 931,867

[22] Filed: Nov. 18, 1986

[51] Int. Cl.⁴ .............................................. G06F 15/48
[52] U.S. Cl. ..................................... 364/439; 364/578
[58] Field of Search ... 364/200 MS File, 900 MS File, 364/300 MS File, 513, 578, 439

[56] References Cited

U.S. PATENT DOCUMENTS

| 3,775,767 | 11/1973 | Fielding | 364/439 |
| 4,063,073 | 12/1977 | Strayer | 364/439 |
| 4,104,512 | 8/1978 | Strayer | 364/439 |
| 4,649,388 | 3/1987 | Atlas | 342/26 |
| 4,706,198 | 11/1987 | Thurman | 364/439 |

OTHER PUBLICATIONS

Steeb, "Distributed Intelligence for Air Fleet Control", Abstract, 1981, Rand Corp., Interm Report.
Chrisley, "Air Traffic Controller Aids for Planning of Arrived Traffic-AnAI Approach", Abstract, Aug. 1987.
Cross, "Computer Understanding of Air Traffic Control Displays" Abstract, IEEE Transactions on Systems 1/85 Man and Cybernetics pp. 133–135.
Niedringhaus, "Automated en Route Air Traffic Control Algorithmic Specifications", Abstract, Federal Aviation Administration, 1983.
Hayes-Roth, "The Knowledge-Based Expert System: A Tutorial", 9/84, pp. 11–28, Computer, vol. 17 #9.
Andriole, "Applications in Artificial Intelligence", 9/1985, pp. 501–503.
Hartzband, "Enhancing Knowledge Representation in Engineering Databases", 9/85, pp. 39–48, Computer.
Tobias, "Time-Based Air Traffic Management Using Expert Systems," Aerodynamics Abstracts, p. 2988, 4/86.
Findler, "Air Traffic Control: A Challenge for Artificial Intelligence," 1/87, pp. 59–66, AI Expert.

Primary Examiner—Parshotam S. Lall
Assistant Examiner—Thomas G. Black
Attorney, Agent, or Firm—Joseph S. Iandiorio; Michael L. Sheldon

[57] ABSTRACT

A expert system form of artificial intelligence for control of air traffic which may also be utilized for air traffic controller training. The expert system receives input data representing the altitude and heading of all aircraft in the control area. The aircraft data is compared with the data of the other aircraft. Sequencing and local flow control is optimized and if a potential conflict arises between two aircraft, clearances are transmitted to the aircraft to resolve the conflict. The aircraft data is also compared with a knowledge base of air traffic control rules for the particular airport involved. An inference engine written in LISP (or another AI language) allows real time access to the knowledge base. The position and heading of each aircraft is monitored and controlled until turned over to the tower for final approach. The expert system may also be used for air traffic controller training and be used as a intelligent tutor. The air traffic controller trainee's clearances are input and compared to those generated by the system. If the trainee's clearances are in error, or can be improved, the expert system prompts the trainee and coaches him in a way so that he learns from his past errors.

2 Claims, 10 Drawing Sheets

EXPERT SYSTEM FOR AIR TRAFFIC CONTROL AND CONTROLLER TRAINING

BACKGROUND AND SUMMARY OF THE INVENTION

This invention relates generally to data processing systems and particularly to a data processing system for controlling air traffic. The data processing system may also be used to provide automated air traffic controller training.

The control of approaching and departing aircraft at busy airports is a stressful occupation with potentially disastrous results should error occur. The air traffic controller is required to monitor dozens of arriving and departing flights on the radar screen. The controller must be aware of each air craft's heading, altitude and speed and be cognizant of the aircraft's future flight path to insure that no aircraft are on a collision course and to sequence aircraft efficiently to help traffic flow and save fuel. The demands of the profession have led to a shortage of qualified air traffic controllers. Accordingly, it is desirable to be able to automate air traffic control with an advanced data processing system. It is further desirable to be able to have a data processing system capable of training air traffic controllers. The present invention is directed towards meeting these objectives.

An experienced air traffic controller intuitively applies many hundreds of "rules" in directing aircraft. Such rules include minimum safe distance, minimum and maximum altitude, proper heading and local rules such as noise abatement guidelines and geographic hazards. A data processing system for controlling aircraft must therefore also be capable of drawing on and acting upon the applicable air traffic control "rules" for the particular airport involved. These rules must be part of the "knowledge base" which is drawn on by the air traffic control system. The present data processing system includes a knowledge base representing the knowledge of the most experienced air traffic controllers. The knowledge base is able to grow incrementally so that as new knowledge is gained it may be readily added to the data base.

The present data processing system integrates the knowledge base of the air traffic control rules into an automated system for the control of aircraft. The system receives as inputs data relating to the altitude, heading and configuration of all aircraft in the control area. The system simultaneously compares the position of all aircraft to determine if any conflict will arise. If any conflict is imminent the headings and altitude of one or more of the aircraft will be adjusted until the conflict is resolved. The aircrafts' positions are continually monitored and as the aircraft reach a predetermined position, the aircraft will be cleared, via appropriate instructions transmitted automatically to the aircraft, to proceed to the next position in the control sequence. The air traffic control data processing continues until the aircraft is turned over to the tower on final approach.

The air traffic control data processing system is also Particularly suitable for air traffic controller training. For training, the system is utilized with simulated radar and aircraft data. The air traffic controller in training inputs suggested aircraft clearances based upon the simulated data appearing on a radar display. The trainee's clearances are compared with the optimum clearances generated by the data processing system. If the trainee's clearances are sufficiently close to the optimum clearances, the simulation proceeds. If the trainee's clearances are less than optimum, the system will output a prompt to the trainee suggesting how the clearance could be improved and the simulation will continue. If the trainee's clearance is seriously in error, the simulation will be interrupted, the trainee informed of the error and the simulation restarted. In this manner the trainee will gain the expertise necessary for the control of aircraft at commercial airports.

Accordingly, it is an object of this invention to provide a data processing system for air traffic control.

It is another object of this invention to provide a data processing system for air traffic controller training.

The system utilizes artificial intelligence in the form of a knowledge base system or expert system so that heuristics or "rules of thumb" are used by the computer just as is now being used by air traffic controllers.

BRIEF DESCRIPTION OF THE DRAWINGS

In order to better understand the invention, reference is made to the following drawings which are to be taken in connection with detailed specification to follow, in which.

DESCRIPTION OF THE PREFERRED EMBODIMENTS

Figure 1:
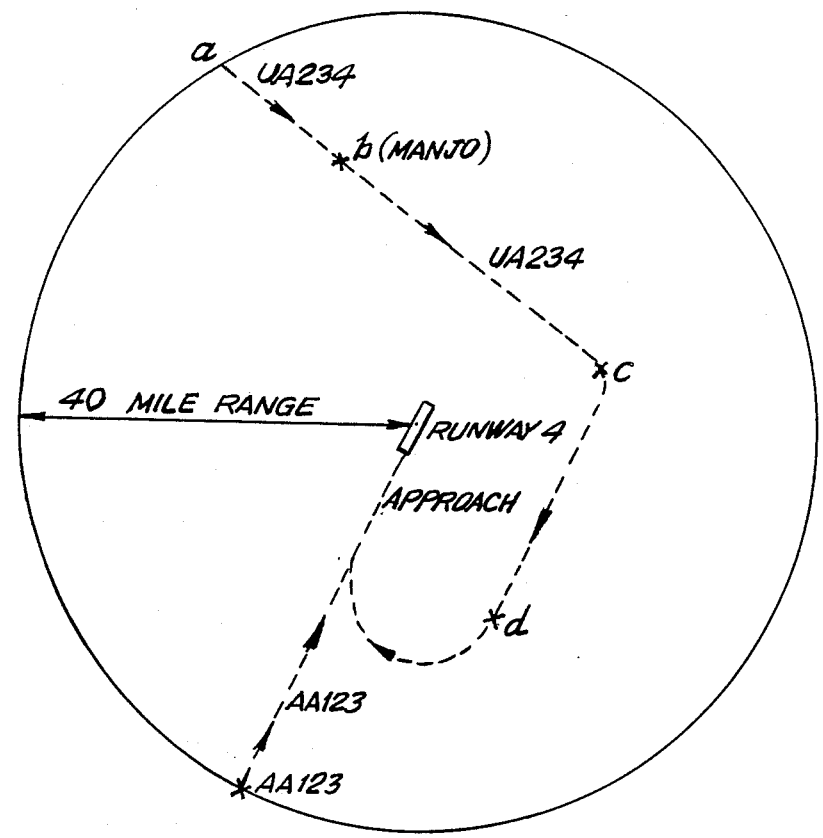
FIG. 1 illustrates a radar display of the flight paths of two aircraft in a landing control sequence.

FIG. 1 illustrates a typical radar display showing two aircraft (United Airlines Flight 234 "UA234" and American Airlines Flight 123 "AA123") approaching a single runway ("Runway 4") for landing. The radar display shows a radius of approximately 40 miles from the airport with the approach paths for the two aircraft shown in dotted lines. As shown, UA234 is on an approach that will require a 90° turn followed by a 180° turn, various positions along its projected flight path are labeled a, b, c and d. Point b is named "MANJO" which is an arbitrary name given by air traffic control to a specific checkpoint. AA123 is making a direct approach to Runway 4. In actuality, many more planes would be located within a 40 mile radius of a major airport. However, two aircraft are sufficient to describe the operation of the present data processing system.

Figure 2:
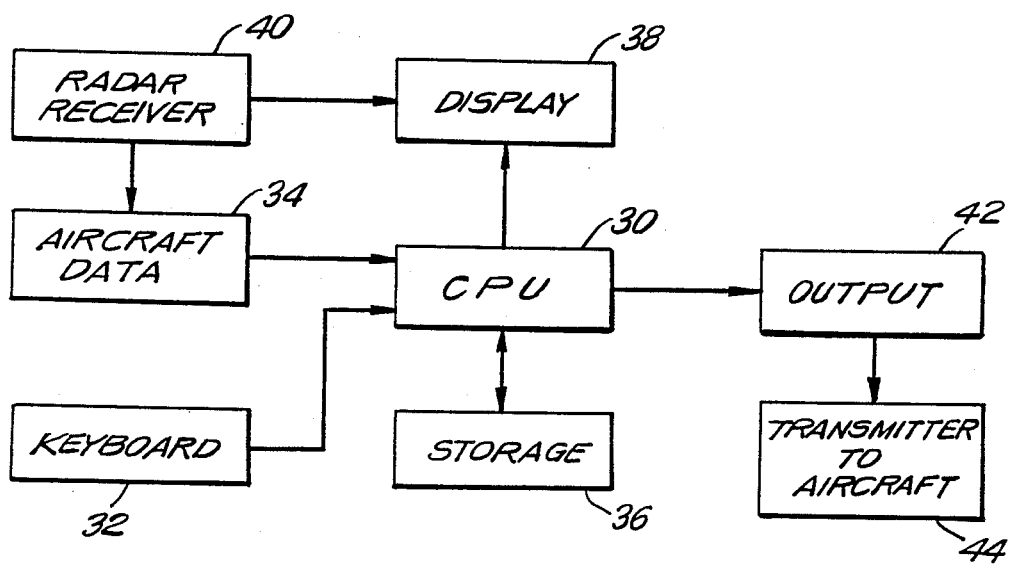
FIG. 2 is a block diagram of the hardware used to implement the data processing system for the control of the aircraft of FIG. 1.

FIG. 2 illustrates, in broad overview, the hardware for implementing the data processing arrangement of the instant invention. The hardware includes a standard stored program controlled central processing unit (CPU) 30, connected to a keyboard 32 and to a standard data/program storage means 36 such as magnetic disk or tape. CPU 30 is also connected to a display 38, generally in the form of a standard radar display similar to that illustrated in FIG. 1. Display 38 is connected for input from a radar receiver 40 and CPU 30 and displays the standard radar "blips" illustrating the aircraft within the control area, the radar transponder data for each aircraft and also displays the commands output to the aircraft by the data processing system.

Connected for input of data to CPU 30 is an input device 34 for the data relating to the aircraft to be controlled as received from radar receiver 40. The aircraft data is transmitted to receiver 40 by the radar transponder of the aircraft and includes the aircraft's speed, heading, altitude and identification. Also connected to CPU 30 is an output device 42 for output of the direction commands to the aircraft. The clearances may be transmitted as data or as voice synthesized verbal commands. Accordingly, output device 42 may be in the form of a voice synthesizer or a data translator. Output device 42 is connected to a transmitter 44 for radio transmission of the directional commands to the aircraft.

Figure 3:
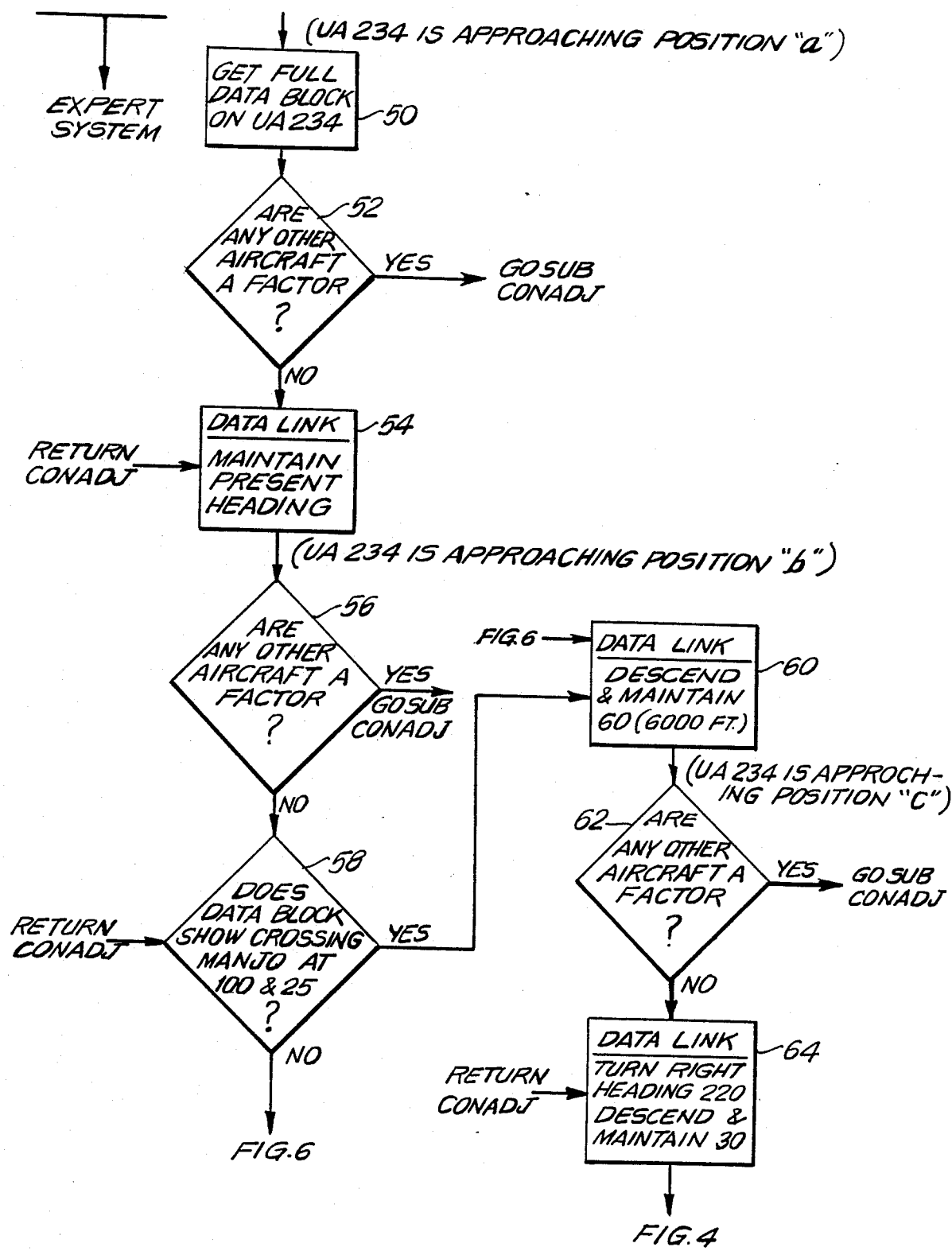
FIGS. 3-8 are flow diagrams of the data processing system used for air traffic control.

FIG. 3 is a flow diagram of a portion of the data Processing arrangement of the present invention. The data Processing of FIG. 3 is based on the aircraft control display shown in FIG. 1 in which UA234 is approaching position a which is at the outer periphery of the radar coverage. At block 50 the data processing will retrieve a full data block on UA234. The data block includes the aircraft's altitude, speed and heading as well as other appropriate identifying information on the aircraft such as whether it is a "heavy" aircraft (i.e., a "jumbo jet"). The data block is received from radar receiver 40 and input into the CPU 30 via input device 34 which may be a standard interface for translating the data into a form capable of being processed by CPU 30.

The artificial intelligence allows the system to access knowledge as it is needed using an inference engine. The means that information is not retrieved sequentially but rather the information is retrieved just as a human retrieves information.

After retrieval of the data at block 50 data processing Proceeds to block 52 where a test is made to determine if any other aircraft are a factor which will affect UA234. This test is made by comparing the data received at block 50 with the data on any other aircraft in the control area as illustrated in FIG. 1. Initially, we will assume that no other aircraft are presently a factor in the approach of UA234 so that the test made at block 52 is negative. Under this assumption, data processing proceeds to block 54 which is labelled "data link" to indicate an output of the data processing system to the aircraft to be controlled. The output comprises the control commands that are to be transmitted to the aircraft. The CPU 30 outputs the commands to output device 42 which, in turn, is connected to transmitter 44 for transmission to the aircraft either in the form of data or by voice synthesized commands. At block 54 the output clearance is "maintain present heading" which informs the pilot of UA234 that he is cleared to proceed to point b on FIG. 1. Alternatively, the aircraft clearances may be transmitted by a human air traffic controller who simply transmits by radio to a pilot the clearance output by the data processing system and displayed on display 38.

As the aircraft approaches MANJO (point b), data processing proceeds to block 56 where, again, a test is made to determine whether any other aircraft will affect UA234. If the result of the test is negative, that is, no other aircraft are affecting UA234's flight path, processing proceeds to block 58 whereby the data block being received from UA234 is compared to the expert system knowledge base of appropriate positioning data for the aircraft. At block 58 the data received from UA234 is read to determine if UA234 crossed MANJO at 100 & 25. That is, did UA234 cross MANJO at an altitude of 10,000 feet (100) at an air speed of 250 knots (25). If at block 58 UA234 has the correct air speed and altitude, the expert system proceeds to block 60 where the clearance to the aircraft to "descend and maintain 60" (i.e., reduce altitude to 6,000 feet) will be output to UA234.

Data processing thereafter continues to block 62 where another test is made to determine if any other aircraft will affect the flight path of UA234. At this time UA234 will be approaching point c of FIG. 1. If no other aircraft are a factor, the expert system continues to block 64 for output of the clearance to UA234 to turn right at a heading of 220 and to descend and maintain a 3,000 foot altitude.

After communication to the aircraft of the clearance of block 64, data processing proceeds to block 66 of FIG. 4 where, again, a test is made to determine if any other aircraft will affect UA234 which is now approaching position d of FIG. 1. If no other factor aircraft are affecting UA234, at block 68 a clearance is output to UA234 to turn right at a heading of 10° and to descend and maintain an 1800 foot altitude. The expert system will thereafter proceed to block 70 to determine whether the data received from the aircraft is normal. If so, processing proceeds to block 72 where UA234 is instructed to contact the tower at a frequency of 119.1 Mhz when the aircraft is over the outer runway marker. At this point, control of the aircraft is turned over to the airport's tower control for the final landing. The above-described expert data processing system was directed to the approach of UA234 where no other aircraft were a factor. We will now consider the situation where other aircraft are affecting the approach of UA234.

The expert system includes a conflict adjustment subroutine ("CONADJ") to adjust the arrival of the aircraft should either aircraft be a factor with respect to the other. If the tests made at blocks 52, 56 and 62 are answered in the affirmative, that is, that another aircraft (AA 123) is a factor with respect to UA 234, the expert system branches to the conflict adjustment subroutine shown in FIG. 5. In the conflict adjustment subroutine of FIG. 5 processing begins at block 80 where the expert system will calculate the distance between the conflicting aircraft at final approach to determine if UA234 will be at its final approach more than three miles either ahead or behind AA123. If the test of block 80 is answered affirmatively, there is no conflict between the approach of the flights because both flights are sufficiently far apart. Accordingly, processing returns from the conflict adjustment subroutine to the appropriate point in FIG. 3.

If at block 80 it is determined that UA234 will arrive at final approach less than three miles either before or after AA123, the expert system proceeds to block 82. At block 82 a determination is made as to whether UA 234 will arrive first so that the trailing flight (AA 123) may be slowed down so that the aircraft arrive more than three miles apart. If at block 82 UA234 will be at final approach before AA123, the expert system proceeds to block 84 where AA123 is cleared to reduce its speed to an indicated amount so as to arrive more than three miles after AA123. Thereafter, the expert system returns out of the subroutine to the next data block of FIG. 3. If at block 82 UA234 will not arrive before AA123, data processing proceeds to block 86 where UA234 is cleared to reduce its speed so that it arrives more than three miles after AA123. Thereafter, the expert system returns from the subroutine of FIG. 5 to the appropriate data block of FIG. 3.

We will now turn to the data processing which occurs if UA234 has not crossed MANJO at 10,000 feet at 250 knots i.e., the test made at block 58 of FIG. 3 is negative). The expert system thereupon calls upon to block 90 of FIG. 6 where the data block is examined to determine if UA234's altitude is between 9,000 and 10,000 feet. If the altitude of UA234 is not within these parameters, the expert systems calls upon block 92 where UA 234 is cleared to expedite its descent rate so as to place it within the desired altitude parameters Alternatively, if at block 90 UA234 is determined to be within the altitude parameters, the expert system calls upon block 94 where the speed of UA234 is checked. At block 94 the data block retrieved from UA234 is examined to determine if UA234's air speed is less than 300 knots. If air speed is less than 300 knots, the expert system returns to block 60 of FIG. 3. If UA234's air speed is greater than 300 knots, the expert system proceeds to block 95 wherein UA234 is cleared to reduce its air speed to the indicated speed. The expert system thereafter returns to block 60 of FIG. 3.

Figure 4:
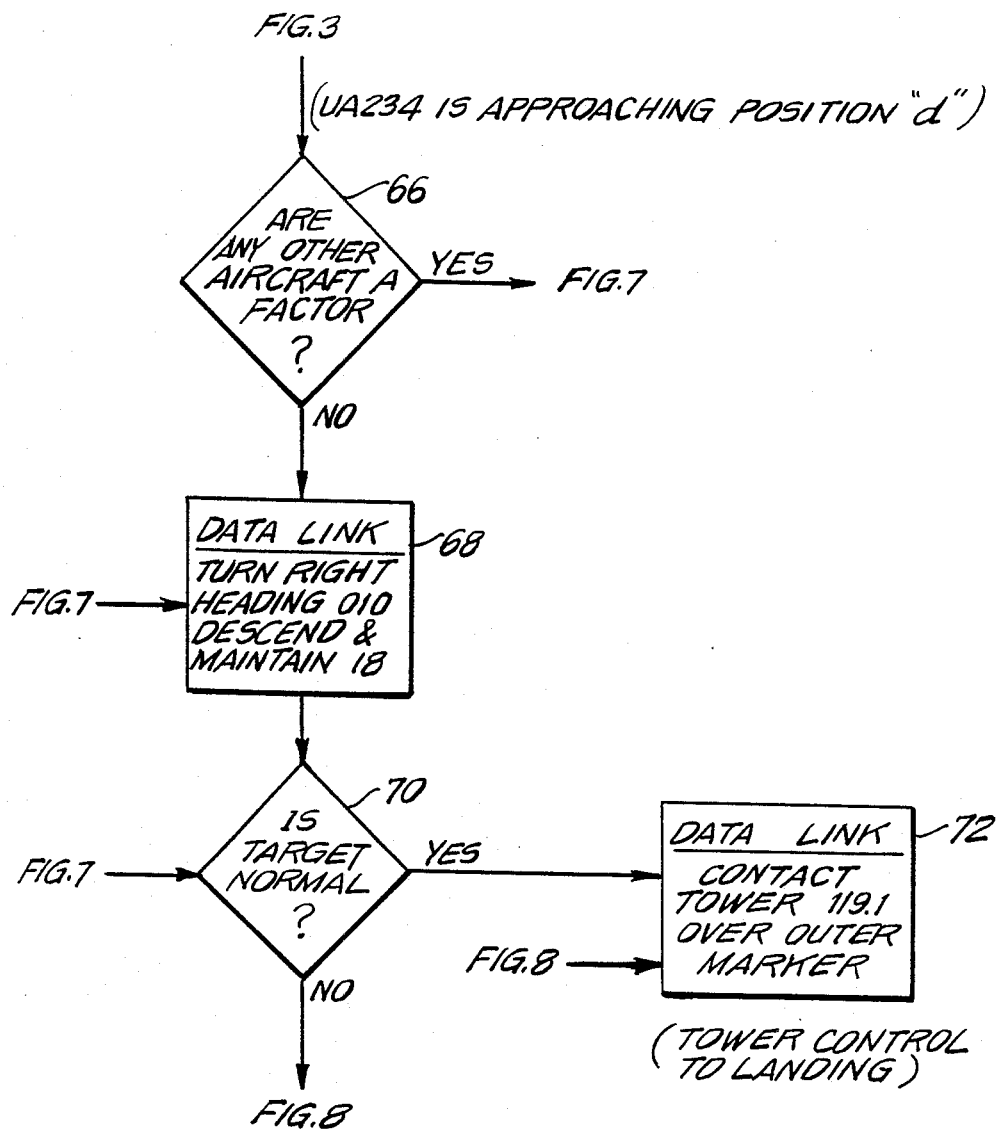
Figure 5:
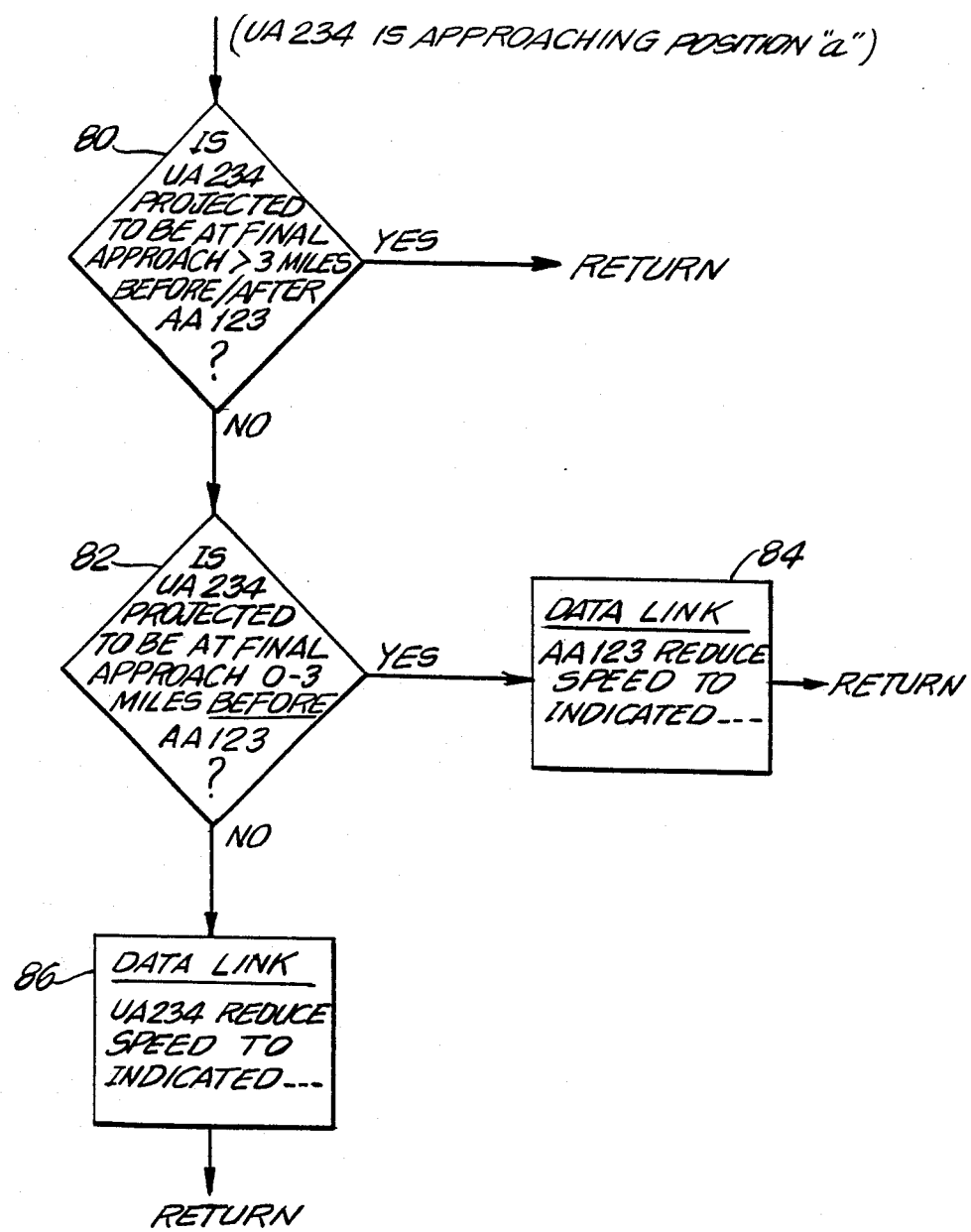
Figure 7:
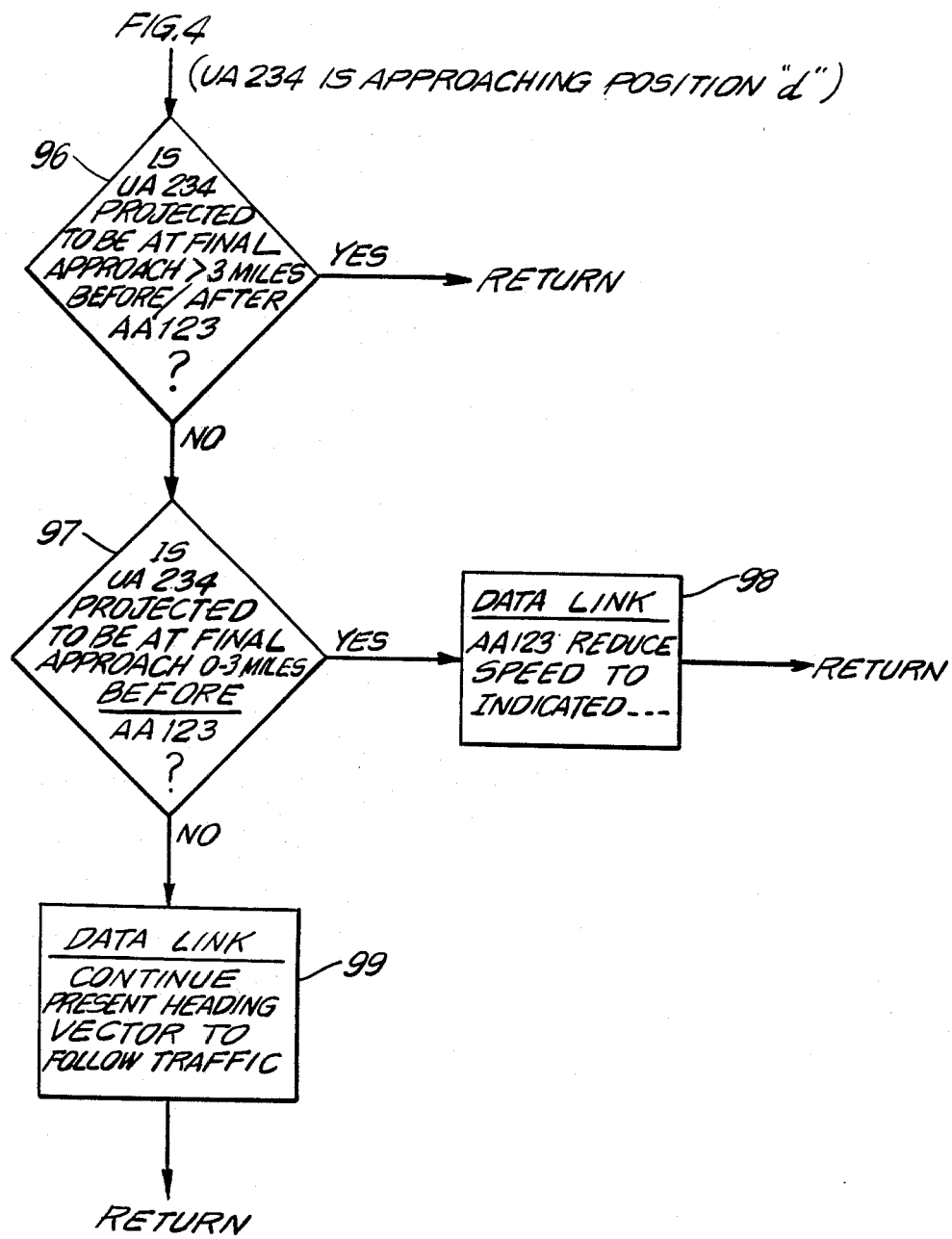

Turning now to block 66 of FIG. 4 in which UA234 is approaching position d and where other aircraft are a factor, the expert system proceeds to FIG. 7 which is a frame similar to the conflict adjustment frame of FIG. 5 but which differs slightly in clearances due to AA234's proximity to final approach. FIG. 7 begins at block 96 where a determination is made if UA234 will be at final approach more than 3 miles either before or after AA123. If so, there will be no conflict and the expert system may return to block 68 of FIG. 4.

If the test made at block 96 is negative, the expert system contacts block 97 to determine if UA234 will be at final approach within 0-3 miles before AA123. If so, the expert system contacts block 98 where AA123 is cleared to reduce its speed to remove the conflict and the expert system thereafter returns to block 68 of FIG. 4. If UA234 at block 97 is not projected to be at final approach within three miles of AA123, the expert system proceeds to block 99 wherein UA234 is cleared to maintain its present heading and is vectored to follow traffic (i.e., AA123). Thereafter, the expert system contacts block 70 of FIG. 4 to determine if UA234's altitude and air speed are normal for landing. If UA234's altitude and air speed are normal, the expert system contacts block 72. If UA234's altitude and air speed are not normal, the expert system proceeds to FIG. 8.

Figure 6:
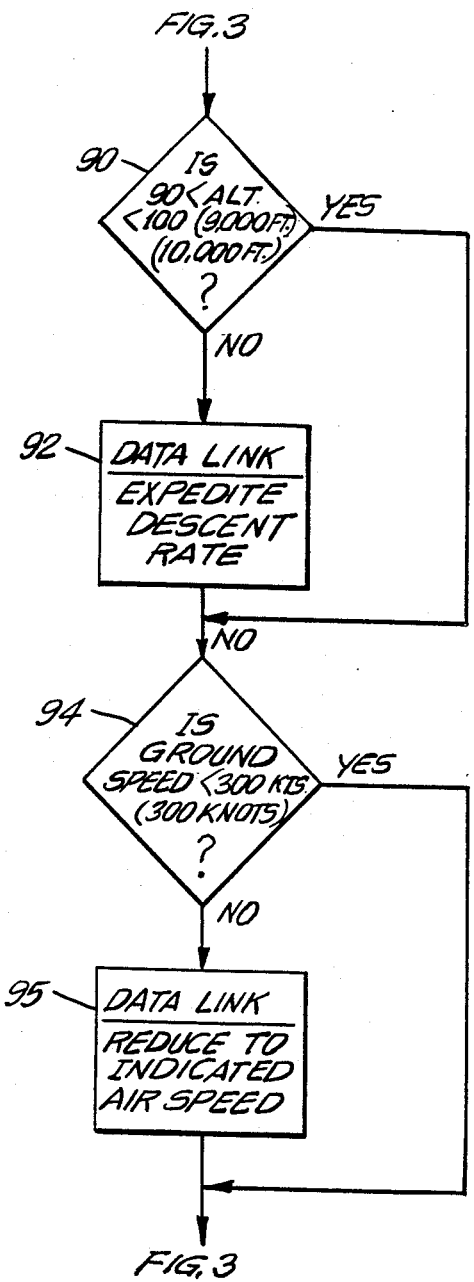
Figure 8:
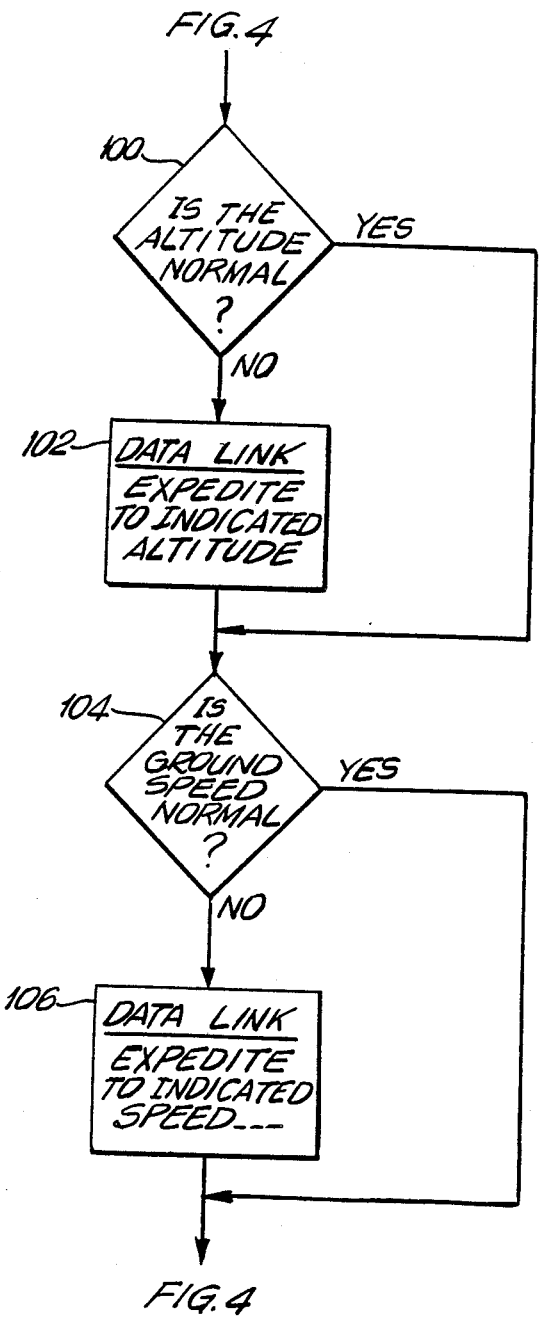

FIG. 8 verifies the altitude and air speed of the aircraft on final approach and is similar to FIG. 6. At block 100 the altitude of UA234 is read from the data block to determine if it is normal for final approach. If it is not, the expert system contacts block 102 whereby UA234 is cleared to adjust its altitude to normal approach altitude. If at block 100 the altitude of UA234 is normal or has been adjusted at block 102, the expert system contacts block 104 for determination if the air speed of the approaching aircraft is normal. If the air speed is normal, the expert system returns to block 72 of FIG. 4 to turn over the aircraft to tower control. If at block 104 the air speed of the approaching aircraft is not normal, the expert system proceeds to block 106 where UA234 is cleared to adjust its speed to appropriate approach speed. Thereafter the expert system returns to block 72 of FIG. 4 to turn over the aircraft to tower control for landing. It is to be noted the expert system may be used to control departing aircraft as well.

As noted previously, this new expert system may also be utilized in air traffic controller training. In such a configuration the air traffic controller trainee will review a simulated radar display and input his clearance via keyboard 32 based on the simulated data. The simulation has been written in the highly efficient computer language C. The inferences engine and knowledge base are written in the AI language LISP to permit elegant manipulation of symbols and decision rules. The clearance input by the air traffic controller will be compared to the clearance by the expert system. If the trainee controller's clearances are within a predetermined range of the clearances by the expert system the trainee air traffic controller is providing proper approach control instructions and the expert system will continue. If, however, the air traffic controller's clearances are not within a predetermined range of the expert system the trainee will be prompted by the expert system to correct his clearances.

Figure 9:
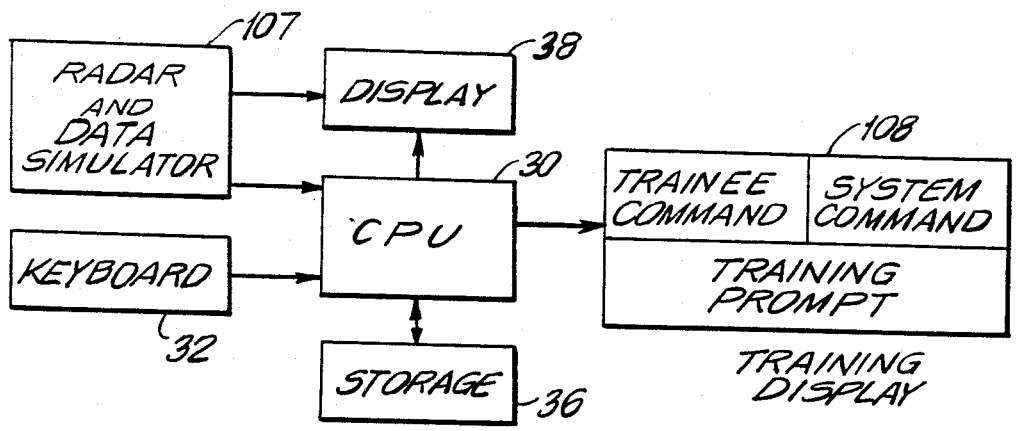
FIG. 9 is a block diagram of the hardware for implementing the data processing when used in air traffic controller training.

The invention has been built on a LISP Machine (Symbolic) linked to a VAX AI Workstation through an Ethernet network. FIG. 9 illustrates appropriate hardware for use of the expert system for air traffic controller training. As is seen FIG. 9 corresponds to FIG. 2 with the same reference numerals used to depict the same hardware. FIG. 9 includes a radar and simulator 107 outputting a simulated air traffic control problem to CPU 32 and radar display 38. The output of CPU 30 is connected to a training display 108, such as a CRT, which is divided into three "windows" for the display of the trainee's suggested control clearances as input via keyboard 32, the clearances generated by the air traffic control data processing via the data processing arrangement described above and a Prompt to the trainee if the trainee's command is at variance with the command generated by the system.

Figure 10:
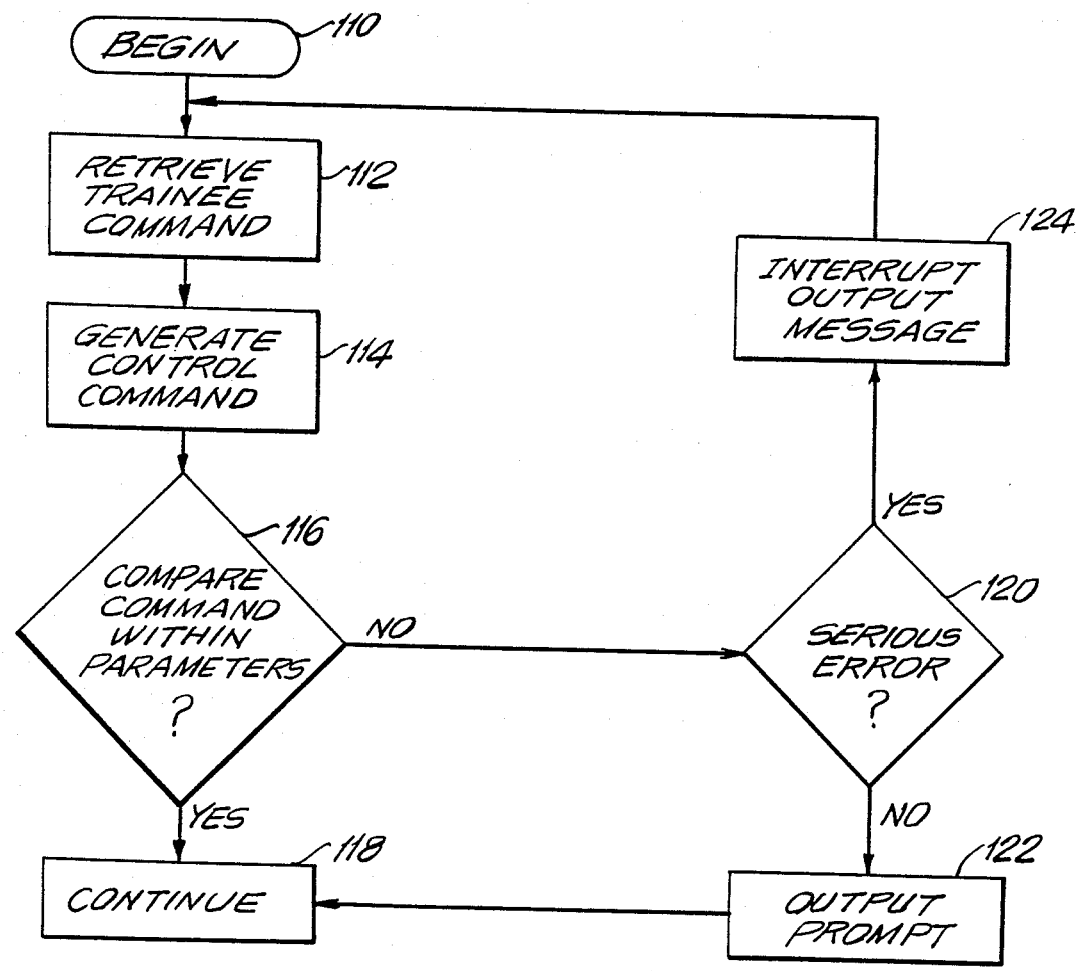
FIG. 10 is a flow diagram of the data processing system as used in air traffic controller training.

FIG. 10 is a flow chart of the expert system used in the training mode for comparing the trainee's clearances with the clearances generated by the expert system. In FIG. 10 we will assume that the simulated control problem involves the same two flight paths as shown in FIG. 1. From the beginning at block 110 the expert system proceeds to block 112 where the clearance input by the trainee in response to the simulated data is retrieved. At block 114 the optimum control clearance generated by the expert system arrangement of FIGS. 3-8 is retrieved. The trainee's clearance is compared to the expert system clearance at block 116 and if the trainee's clearance is within an appropriate range of the optimum clearance the simulation continues to block 118. If, however, the trainee's clearance is outside of the optimum parameters the expert system contacts block 120 where it is determined from the knowledge base if the clearance is seriously in error. If the trainee's clearance is not seriously in error, the expert system contacts block 122 whereby a message will be output to the prompt window of display 108 suggesting how the trainee's clearance may be improved. This computerized intelligent tutor is "taught" when to interrupt and what form the interruption is to take. Thereafter the simulation continues. If the trainee's clearance is seriously in error, the expert system contacts block 124 where the simulation will be interrupted and an error message output in the prompt window of display 108. The system thereafter returns to the beginning of the sequence so that the simulation may be repeated until the trainee learns the optimum control clearances.

Figure 11:
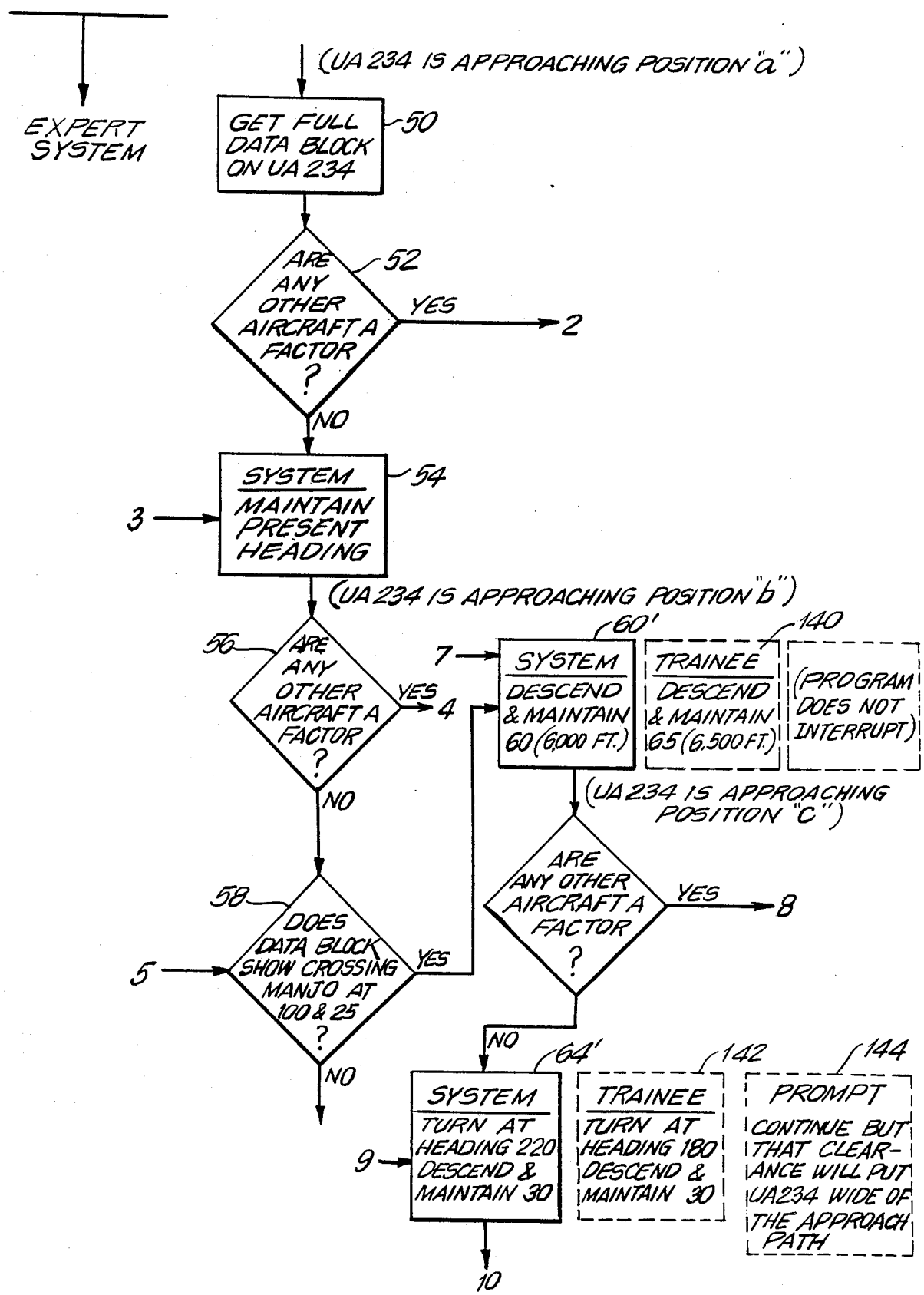
FIGS. 11 and 12 are flow diagrams corresponding to FIGS. 3 and 4, of the data processing as used for air traffic controller training showing the trainees suggested control clearances and the system's prompts to the trainee.
Figure 12:
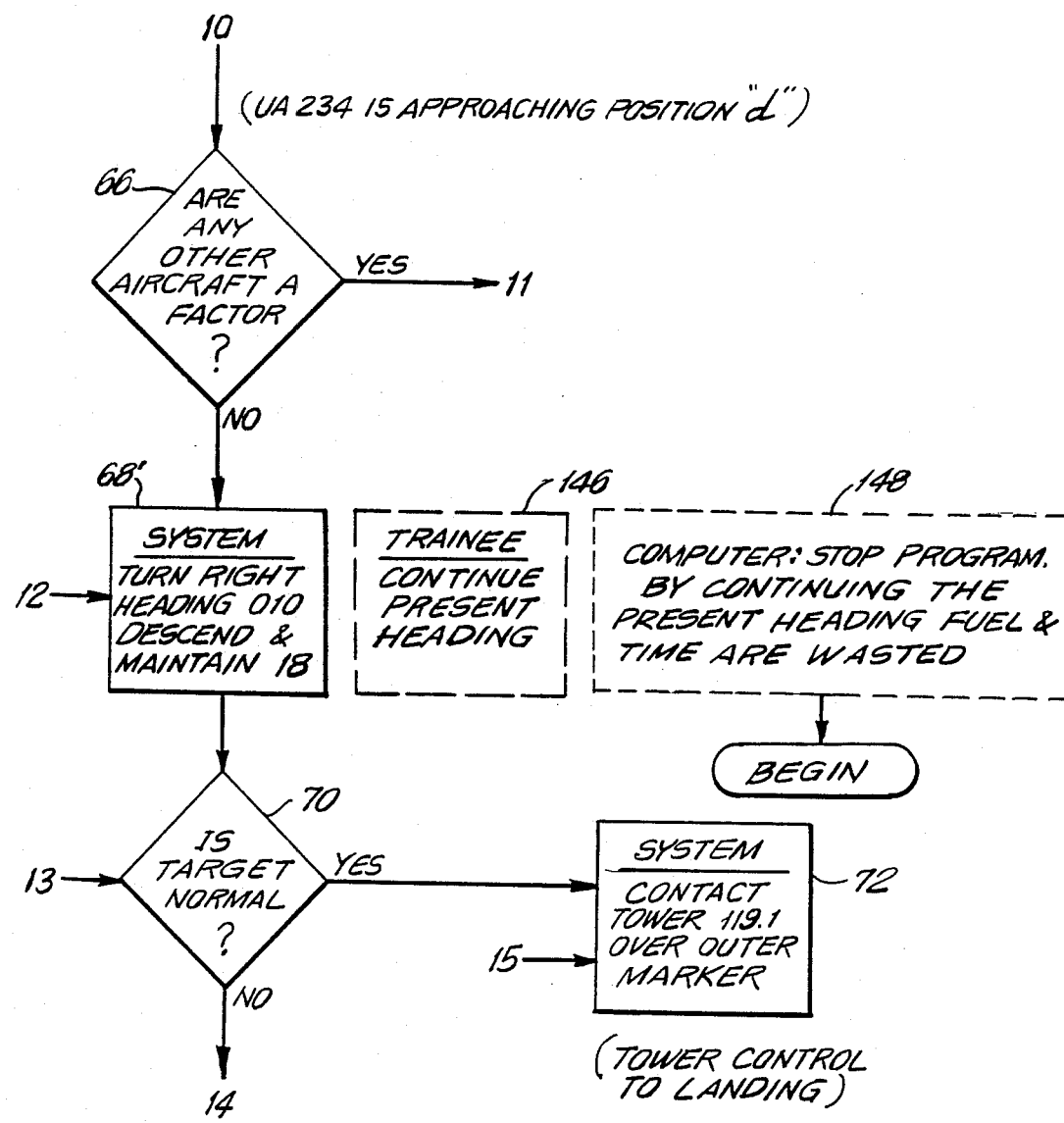

FIGS. 11 and 12 correspond to the expert system of FIGS. 3 and 4 with the same expert system blocks labeled with the same reference numerals. As shown in FIGS. 11 and 12, the expert system operation is essentially identical to that of FIGS. 3 and 4. However, FIGS. 11 and 12 also illustrate the clearance input by the trainee and any prompts generated by the expert system to instruct the trainee. The "data link" blocks 60, 64 and 68 of FIGS. 3 and 4 are replaced by system clearance blocks 60', 64' and 68' of FIGS. 11 and 12. The system clearances, rather than being transmitted to an aircraft, are displayed in the system clearance window of display 108 and are compared by the expert system with the trainee's clearances Next to each system control command 60', 64', 68' are shown the clearances 140, 142 and 146 input by the trainee which are displayed in the trainee clearance window of display 108.

At block 60' the clearance generated by the expert system is "descend and maintain 6,000 feet". The trainee has input a clearance at block 140 to descend and maintain 6,500 feet. The trainee's clearance is compared to the optimum clearance of the data expert system as shown in FIG. 10. However, in this case the trainee's clearance is within a predetermined range of the expert system clearance so that no interruption is made and the simulation proceeds.

Turning now to block 64' where the clearance generated by the expert system is to turn right, descend to 2,200 feet and maintain 300 knots. The clearance input by the trainee at block 142 is to turn right at a heading of 180° and to maintain 300 knots. The trainee's clearance is compared to that of the expert system. In this case the trainee's clearance is sufficiently at variance from the expert system's clearance so that the trainee should be informed of the optimum command but the simulation can continue. Accordingly, at block 144, the expert system will output in the training prompt window of display 108 a prompt 144 that will inform the trainee that the heading suggested for UA234 will place it wide of the approach path. Thus, the trainee is informed that his proposed command is less than optimum. This is the essence of the computerized intelligent tutor thereafter, the expert system proceeds to FIG. 12.

At block 68' of FIG. 12 the optimum clearance generated by the expert system at block 68' is for UA234 to turn right at a heading of 10° at an altitude of 1,800 feet. The trainee at block 146 has input a clearance that UA234 continue its present heading. The trainee's clearance is compared to the expert system's optimum clearance and is found to be seriously in error so that the trainee should be informed and the simulation interrupted. This too is an important part of the computerized intelligent tutor. The computer will interrupt the simulation and output in the training prompt window of display 108 a Prompt 148 informing the trainee that the command was in error and that continuing present heading will waste time and fuel. Thereafter, the simulation may be repeated so that the trainee may learn from previous mistakes.

The symbolic languages used in "artificial intelligence" applications, such as LISP or PROLOG, with the language C used for the simulation portion are particularly suitable for this application. In order to illustrate the expert system previously described by reference to flow charts note the following lines of LISP code:

```
(defun atc2 (AA123)
1    (cond ((eq AA123 'no-other-aircraft-a-factor)
             'maintain-present-heading)
2           ((eq AA123 'other-aircraft-approaching-at-zero-
             degrees) 'go-to-frame-101)
3           ((eq AA123 'other-aircraft-approaching-at-180-
             degrees) 'go-to-frame-101)
4           ((eq AA123 'aircraft-in-front) 'go-to-frame-103))).
     for front
```

The system is divided into "frames". The first line of the above frame (frame ATC 2) constitutes the "are any other aircraft a factor" test undertaken at blocks 52, 56 and 62 of FIG. 3. The frames that are to be branched to constitute the "conflict adjustment" subroutine similar to that of FIG. 5. If at line 1 of the above frame no other aircraft are a factor the command "maintain-present heading" is output to the aircraft. Lines 2 and 3 contact frame 101 if other aircraft are approaching at either 0° or 180° (due North or South). Line 4 is directed to the situation where another aircraft is in front of AA123, in this case line 4 calls up frame 103.

Frame 101 provides for conflict adjustment when branched to from the above frame and reads as follows:

```
(defun frame 101 (AA123)
1    (cond ((eq AA123 'other-air-est-arrive-within-3-mi-
             before) 'decrease-speed-AA123)
2           ((eq AA123 'other-air-est-arrive-more-than-3-mi-
             before) 'maintain-speed-AA123)
3           ((eq AA123 'other-air-est-arrive-more-than-3-mi-
             after) 'maintain-speed-AA123)))
```

Line 1 considers the situation where the other aircraft will arrive within 3 miles before AA123, if so, AA123 will be told to decrease its speed, which will increase the distance between the aircraft and thus resolve potential conflict. Lines 2 and 3 of the frame consider the situation if the other aircraft will arrive more than 3 miles before or after AA123. In such a situation there is no potential conflict and thus no change in AA123 air speed is required, thus AA123 is cleared to maintain its present speed.

Frame 103 is contacted from line 4 of frame ATC 2 where there is an aircraft in front of AA123 and reads as follows:

```
(defun frame 103 (AA123)
1    (cond ((eq AA123 'front-aircraft-speed-eq-AA123)
             'maintain-speed)
2           ((eq AA123 'front-aircraft-speed-    -AA123)
             'maintain-speed)
3           ((eq AA123 'front-aircraft-speed-    -AA123)
             'decrease-speed)))
```

This frame adjusts the speed of AA123 so that AA123 will not gain on the aircraft in front. Lines 1 and 2 determine if the speed of the aircraft in front is either equal to or greater than that of AA123. If either is the case then AA123 is ordered to maintain its speed. Line 3 controls the situation where the speed of the aircraft in front is less than that of AA123. If so, AA123 is told to decrease its speed so that it will not close on the aircraft in front.

As is seen each "frame" comprises both the "knowledge base" which is used to control the approach of incoming aircraft and the means to control program flow in response to the data received from the aircraft. The inference engine determines what frames to call upon. Such frames may be readily modified, added or deleted to modify the control of approaching aircraft. Certain frames may only become active under certain conditions such as at night or in poor weather.

The above-described arrangement is merely illustrative of the principles of the present invention. Numerous modifications and adaptations thereof will be readily apparent to those skilled in the art without departing from the spirit and scope of the present invention.

What is claimed is:

1. An expert data processing system to act as an intelligent tutor for air traffic controller training comprising:
    means for simulating data transmitted from the aircraft that are to be controlled, said simulated data representing the position and heading of the aircraft;
    means for input of air traffic control clearances by an air traffic controller trainee;
    a stored program controlled computer having data input means for input of said simulated aircraft data and output means for output of control clearances;
    data processing means for accessing the simulated aircraft data from a first aircraft and comparing said data to simulated data from another aircraft, means for comparing the data of said first and second aircraft with a knowledge base of aircraft control data, means for branching within said knowledge base based on said comparison, means for outputting control clearances based on a comparison of the simulated aircraft data with said knowledge base, means for comparing the control clearance generated by said data processing with said trainee's control clearance and means for output of said control clearance, said trainee's clearance and said comparison.

2. The system as claimed in claim 1 further including display means connected to said output means, said display means displaying said control clearance, said trainee's clearance and said comparison in juxtaposition to each other.

* * * * *

UNITED STATES PATENT AND TRADEMARK OFFICE
CERTIFICATE OF CORRECTION

PATENT NO. : 4,827,418
DATED : May 2, 1989
INVENTOR(S) : Arthur Gerstenfeld

It is certified that error appears in the above-identified patent and that said Letters Patent is hereby corrected as shown below:

On the title page item [73] should read:

--UFA, Inc., --

Signed and Sealed this

Twenty-first Day of May, 1991

Attest:

HARRY F. MANBECK, JR.

Attesting Officer

Commissioner of Patents and Trademarks